United States Patent [19]

Hewson, Jr.

[11] 4,187,395
[45] Feb. 5, 1980

[54] STEREO SOUND RECORDING AND REPRODUCTION APPARATUS

[76] Inventor: Robert G. Hewson, Jr., 204 Concord Dr., Harleysville, Pa. 19438

[21] Appl. No.: 908,645
[22] Filed: May 23, 1978
[51] Int. Cl.² .................................................. H04R 5/02
[52] U.S. Cl. ............................ 179/1 GA; 179/1 G; 179/1 E; 181/148; 312/7 R
[58] Field of Search ............... 179/1 GA, 1 G, 1 AT, 179/1 R, 1 E, 1 UL, 1 MN, 1 SW, 100.4 ST, 100.41 K; 181/148; 325/119, 352; 312/7 R, 7 TV, 8

[56] References Cited

U.S. PATENT DOCUMENTS

| | | | |
|---|---|---|---|
| 1,917,554 | 7/1933 | Shearer | 181/148 |
| 3,090,462 | 5/1963 | Huff et al. | 312/7 R |
| 3,115,548 | 12/1963 | Stowell | 179/1 AT |
| 3,385,929 | 5/1968 | Magyar et al. | 179/1 GA |
| 3,538,254 | 11/1970 | Ancha | 179/1 AT |
| 3,892,921 | 7/1975 | Burkowitz | 179/1 MN |

FOREIGN PATENT DOCUMENTS 130528 of 1932 Fed. Rep. of Germany ........... 181/148

Primary Examiner—Douglas W. Olms
Attorney, Agent, or Firm—Frailey & Ratner

[57] ABSTRACT

An integrated, self-contained stereophonic sound recording and reproduction system housed within a console having a front desk-like component and a rear storage component. The desk-like component includes a pair of spaced-apart speaker cabinets, each containing a speaker and supporting a horizontal work table on which spaced turntables are mounted. A support panel extending generally upward rearwardly of the work table mounts a plurality of operatively connected component parts of the system, including a microphone, a record/play 8-track tape deck, a record/play cassette deck, an amplifier, a mixer and volume control means. The storage component of the console includes the support means, and provides compartments for storage and for housing the electrical system for the functional operation of the apparatus. The invention provides a sound recording and reproduction system which is capable of blending sounds from separate sources in any selected manner, and may record or reproduce such blended sounds as desired. It is useful as an entertainment center, or for instructional purposes, or for self training in broadcasting.

6 Claims, 3 Drawing Figures

STEREO SOUND RECORDING AND REPRODUCTION APPARATUS

BACKGROUND OF THE INVENTION

In recent years, stereophonic sound systems have become increasingly popular as entertainment centers or devices. They usually include loud speakers and various electronic components, such as record players or turntables, a tape deck, an amplifier and various controls. Such systems usually are adapted for the reproduction of prerecorded sound for listening pleasure. They are not adapted for both recording and reproduction of sound, nor for the rearranging or blending of sounds previously recorded, nor are they sufficiently flexible to be adapted to a disco-type operation. Examples of such prior stereophonic sound reproduction systems, incorporated into consoles of various types, are illustrated by the following U.S. Pat. Nos. 3,301,952 3,347,607, 3,467,392, 3,467,455, 3,680,936, 3,926,487 and 3,936,106.

SUMMARY OF THE INVENTION

A primary object of this invention is to provide a new and improved integrated, self-contained stereophonic sound recording and reproduction system housed within a console, for use as a home entertainment center, or for school or instructional use, or for use in a disco-type operation.

A further object of the invention is to provide a sound recording and reproduction system which is capable of blending sounds from separate sources in any selected manner, and recording or reproducing such blended sounds as desired. The sound system of the invention is capable of performing in the manner of a disc-jockey console, whereby an operator may superimpose and record speech over musical compositions which also are being recorded by the system.

A further object is to provide a novel stereophonic sound and reproduction system which provides means whereby small musical groups may record their own compositions, which lends iteslf for instructional use in training personnel for careers in broadcasting and which permits entertainment by providing a complete and flexible system for the selected recording of sounds, the blending of recorded sounds and the selected reproduction thereof.

Other objects and advantages of the invention will be obvious from the preferred embodiment thereof set forth in the following disclosure.

DETAILED DESCRIPTION OF THE INVENTION

Figure 1:
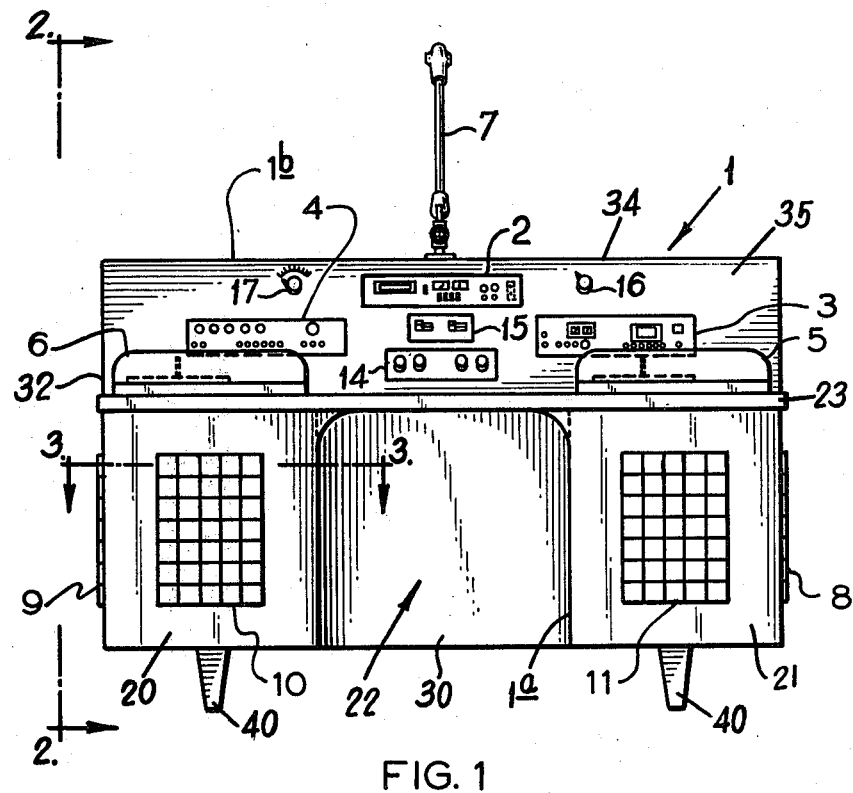
FIG. 1 is a schematic view in front elevation of an integrated, self-contained stereophonic sound recording and reproduction system incorporating this invention.
Figure 2:
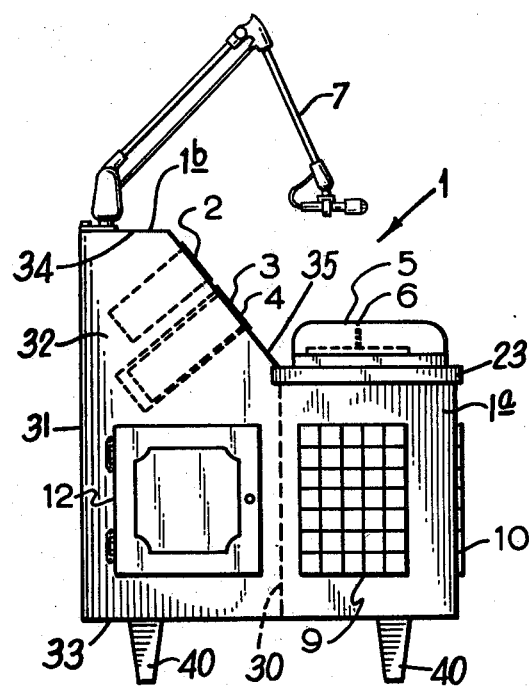
FIG. 2 is a view in side elevation, looking in the direction of the angled arrows 2—2 of FIG. 1.
Figure 3:
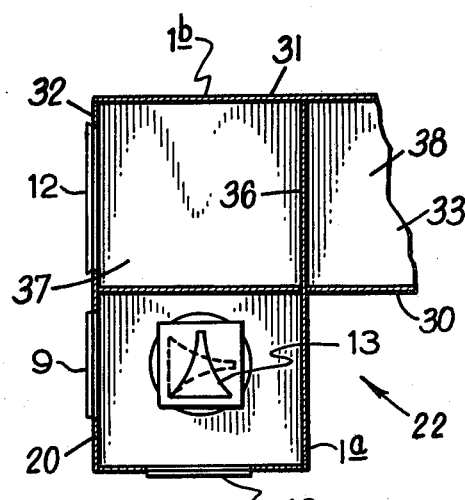
FIG. 3 is a fragmentary view in section taken as indicated by the angled arrows 3—3 of FIG. 1.

FIGS. 1—3 of the drawing illustrate a preferred embodiment of this invention comprising an integrated, self-contained stereophonic sound recording and reproduction system housed within a console or cabinet 1, which may be made of wood, solid or veneered, or of a substitute for wood having a wood grain finish, such as plastic or metal. The console 1 consists of a front desk-like component 1a and a rear generally hollow storage component 1b.

The front, desk-like component 1a of the console 1 includes a pair of spaced-apart speaker cabinets 20, 21 separated by a space 22, disposed intermediate of the desk component. The two speaker cabinets 20, 21 support a horizontally extended member or table 23, which extends the full width, or slightly more, of the console 1, and provides an upper horizontal work surface for the apparatus. As will be observed from the drawing, the space 22 is defined by the spaced cabinets 20, 21 and the horizontal member 23. The rear portion of the space 22 is closed by the front wall 30 of the storage component 1b of the console 1.

Mounted on the upper horizontal work surface of support member 23 are a pair of spaced record players or turntables 5, 6 of conventional design. The location of the spaced turntables 5, 6, spaced cabinets 20, 21, horizontal work member 23 and space 22 provides a desk-like arrangement 1a, whereby a person utilizing the apparatus of the invention may be seated on a chair (not shown) at the space 22, with ready access to the turntables 5 and 6, and all other components of the system.

Each of the speaker cabinets 20, 21 contain a rotatable speaker 13 (FIG. 3), which is selectively turnable about a vertical axis. Each speaker may be of conventional stereo design with a suitable woofer and tweeter with electronic crossover. Speaker cabinet 20 is provided with a sculptured foam side grill 9 and a sculptured foam front grill 10. Similarly, speaker cabinet 21 is provided with sculptured foam side and front grills 8, 11.

The rear hollow storage component 1b of the console 1 is composed of vertical front wall 30, vertical rear wall 31, vertical side wall 32, which is disposed rearwardly of speaker cabinet 20, and a second vertical side wall (not shown) disposed rearwardly of speaker cabinet 21. The two vertical side walls of the storage component 1b are spaced apart a distance generally equal to the width of the console 1. The storage component 1b further includes a lower horizontal floor 33 and an upper, abbreviated horizontal top or panel 34. Disposed between the front edge of the abbreviated top 34 and the rear portion of the horizontal surface 23 is an elongated, inclined member or panel 35, which extends approximately the full width of the console 1. The inclined panel 35 and the abbreviated panel 34 together close off the top of the storage component 1b, and comprise support means for various integrally connected components or parts of the self-contained sound recording and reproduction system of this invention.

The storage component 1b may be provided with vertical partitions, such as partition 36 (FIG. 3), for dividing the storage components into two or more separate compartments, such as compartments 37 and 38. The compartment 37 may be provided with a door 12, and may be utilized for storage. Compartment 38 may be utilized for housing the circuitry and other electrical or electronic control gear (not shown), which interconnect the various operative parts of the sound recording and producing system of the invention and provide for the functional operation of the apparatus. Preferably, it is provided with a slidable or removable rear panel (not shown) for access thereto.

The support means comprising the generally upwardly extending panel 35 and the abbreviated top 34 of the storage component 1b is designed to support various parts of the apparatus of this invention, including an articulated microphone 7, a record/play 8-track tape deck 2, a record/play cassette deck 3, an amplifier 4, a mixer 14 and a cue button 15. Preferably, the amplifier 4 is a composite unit which also includes an AM/FM radio. The inclined panel also mounts an on-off switch 16 for the apparatus and a volume control 17. All of the foregoing components mounted on the support means 35, 34 are of conventional construction and design, and are readily adapted for operational interconnection with each other, and with the turntables 5, 6 and the speakers 13, by suitable electrical and electronic circuitry (not shown) to provide an integrated, self-contained stereophonic sound reproducing and recording system.

Preferably, the microphone 7 is provided with a feedback filter and an on-off button. Such arrangement permits recordation of a human voice speaking into the microphone during recordation of music or other sound by electronic transscription, while silencing the speakers 13. As is well known, the speakers, even though silent to the human ear, are still enabled to emit electronic signals to the recording units 2, 3.

The turntables 5, 6 preferably are single record units each with a manually controlled arm. Preferably, each is gear driven, to provide for more accurate timing control. The cue button 15 is utilized to position or maneuver selectively the arms of the turntables to a position, relative to a disc recording, where its sound is ready to commence. By arranging for gear driven turntables controlled by the cue switch, accurate control over the playing of records on the turntables 5, 6 is provided.

The mixer 14 may be of the so-called "mini-mixer" type. It blends music or other sound from two separate sources, and permits "cross-over", i.e. overlapping sounds from two sources while phasing one sound in and phasing the other out. It enables utilization of the apparatus in a disco-type operation.

The various electrical and electronic parts illustrated in the drawing should be high quality balanced units capable of being mounted in, and supported by, the console 1 with maximum convenience of accessability and operation. If desired, the upper work surface of the horizontal panel 23 may be made of Formica, or similar wear resistant composition. While the console 1 is shown as being provided with a plurality of legs 40, casters or similar means may be provided, in lieu thereof, to permit ready movability or maneuverability.

The microphone 7 preferably is mounted centrally of the console 1, and is articulated to permit its selected displacement relative to the desk-like component 1a of the console. The microphone, the turntables 5, 6 and the various component parts of the system mounted on the panels 34, 35 are located proximate to the three dimensional space 22, to permit ready and convenient access thereto by an operator sitting on a chair (not shown) at the location of the space.

Although a preferred embodiment of this invention has been shown and described herein for the purpose of illustration, as required by Title 35 U.S.C. ₰ 112, it is to be understood that various changes, modifications and alterations may be made thereto without departing from the spirit and utility of the invention, or the scope thereof as set forth in the appended claims.

I claim:

1. An integrated, self-contained stereophonic sound recording and reproduction system housed within a console, said console comprising a front desk-like component and a rear storage component, said system including
   (a) a pair of stationary spaced-apart speaker cabinets, each cabinet containing a speaker mounted rotatably internally of the cabinet,
   (b) a horizontal surface supported by and extending between the speaker cabinets and mounting at least one turntable,
   (c) an open three dimensional space located between the two speaker cabinets and below the horizontal surface,
   (d) said speaker cabinets, horizontal surface and open space constituting the desk-like component of the console,
   (e) support means disposed above the horizontal surface for mounting a plurality of operably connected component parts of the sound recording and reproduction system,
   (f) said component parts including
      (1) a microphone,
      (2) at least one record/play unit,
      (3) an amplifier,
      (4) a mixer and
      (5) volume control means, and
   (g) at least one hollow compartment constituting the rear storage component, said compartment having access means for permitting storage therein and including support means for mounting component parts of the sound recording and reproduction system.

2. The invention of claim 1, wherein the support means includes an inclined panel extending upwardly and rearwardly relative to the console, and is disposed intermediate the desk-like component and the storage component.

3. The invention of claim 1, wherein
   (a) the horizontal surface supported by the speaker cabinets comprises a work table and
   (b) the support means comprises
      (1) a horizontal panel located above and rearwardly of the table and
      (2) an inclined panel extending upwardly and rearwardly relative to the console,
      (3) said inclined panel interconnecting the work table and the upwardly and rearwardly located horizontal panel.

4. The invention of claim 3, wherein
   (a) the microphone is mounted on the horizontal panel, and is articulated to permit selective displacement relative to the desk-like component of the console and to the inclined panel,
   (b) selected component parts of the sound recording and reproduction system are mounted on the inclined panel and
   (c) the microphone, the selected component parts and the turntables are located proximate to the three dimensional space defined by the two cabinets and the horizontal surface, whereby an operator positioned at the three dimensional space may have ready and convenient access to said microphone, component parts and turntables in the operation of the system.

5. The invention of claim 1, wherein the storage component includes at least one compartment for storage and a second compartment for housing circuitry and electrical and electronic control gear for operably connecting the component parts of the system.

6. The invention of claim 1, further including
   (a) at least one record/play 8-track tape deck and
   (b) at least one record/play cassette deck.

* * * * *